US012623551B2

(12) United States Patent
Nemeth et al.

(10) Patent No.: US 12,623,551 B2
(45) Date of Patent: May 12, 2026

(54) METHOD FOR CONTROLLING A MULTITUDE OF BRAKING DEVICES AND BRAKING SYSTEM OF A VEHICLE

(71) Applicant: KNORR-BREMSE Systeme fuer Nutzfahrzeuge GmbH, Munich (DE)

(72) Inventors: Huba Nemeth, Budapest (HU); Zoltan Toth, Budapest (HU); Tamas Dohany, Pecs (HU); Aron Kutas, Izsak (HU); Gabor Liptak, Budapest (HU); Krisztian Sandor, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 70 days.

(21) Appl. No.: 18/695,559

(22) PCT Filed: Oct. 14, 2022

(86) PCT No.: PCT/EP2022/078637
§ 371 (c)(1),
(2) Date: Mar. 26, 2024

(87) PCT Pub. No.: WO2023/062187
PCT Pub. Date: Apr. 20, 2023

(65) Prior Publication Data
US 2024/0408968 A1 Dec. 12, 2024

(30) Foreign Application Priority Data
Oct. 15, 2021 (EP) .................................... 21203032

(51) Int. Cl.
B60L 7/18 (2006.01)

(52) U.S. Cl.
CPC ............. B60L 7/18 (2013.01); B60L 2240/12 (2013.01); B60L 2240/54 (2013.01)

(58) Field of Classification Search
CPC .... B60L 7/18; B60L 2240/12; B60L 2240/54; B60T 2270/604; B60T 2270/613; B60T 1/10; B60W 30/18127
See application file for complete search history.

(56) References Cited

U.S. PATENT DOCUMENTS 4,962,969 A * 10/1990 Davis .................. B60W 10/184
303/3
5,253,929 A * 10/1993 Ohori ...................... B60T 7/042
303/3

(Continued)

FOREIGN PATENT DOCUMENTS

DE 199 09 809 A1 9/1999
DE 10 2016 221 622 A1 5/2018

(Continued)

OTHER PUBLICATIONS

International Search Report (PCT/ISA/210) issued in PCT Application No. PCT/EP2022/078637 dated Jan. 16, 2023 (4 pages).

(Continued)

*Primary Examiner* — Mussa A Shaawat
(74) *Attorney, Agent, or Firm* — Crowell & Moring LLP

(57) ABSTRACT

A method for controlling a multitude of braking devices of a vehicle to effect a desired brake function quantified as a desired brake parameter, wherein each of the braking devices is controllable by an actuation parameter to effect at least a portion of said desired brake function, comprising the steps: determine, for each braking device, a brake capability representing a maximum brake function achievable by the braking device; determine, for each braking device, an actuation priority, wherein the actuation priority is determined from at least one predetermined operating parameter of the braking device and/or the vehicle; in order from highest priority to lowest priority of the braking means, allocating, to each braking device, the actuation parameter, (Continued)

wherein the actuation parameter is chosen between the brake capability and the quantity of the desired brake parameter not yet allocated to other braking devices, whichever is lower. Further, a braking system for a vehicle is configured to carry out the method.

13 Claims, 1 Drawing Sheet

(56)                 References Cited

U.S. PATENT DOCUMENTS

| | | | | |
|---|---|---|---|---|
| 5,358,317 | A * | 10/1994 | Cikanek | B60L 3/108 |
| | | | | 303/3 |
| 5,433,512 | A * | 7/1995 | Aoki | B60T 8/267 |
| | | | | 303/3 |
| 5,450,324 | A * | 9/1995 | Cikanek | B60T 13/58 |
| | | | | 303/3 |
| 5,539,641 | A * | 7/1996 | Littlejohn | B60T 8/1764 |
| | | | | 303/169 |
| 5,568,962 | A * | 10/1996 | Enomoto | B60L 3/0046 |
| | | | | 303/3 |
| 5,882,093 | A * | 3/1999 | Enomoto | B60L 7/26 |
| | | | | 303/113.5 |
| 5,951,115 | A * | 9/1999 | Sakai | B60T 8/267 |
| | | | | 303/3 |
| 6,120,115 | A * | 9/2000 | Manabe | B60W 30/18127 |
| | | | | 303/162 |
| 6,923,512 | B2 * | 8/2005 | Andersson | B60T 13/662 |
| | | | | 303/174 |
| 7,034,476 | B2 * | 4/2006 | Wang | B60L 15/10 |
| | | | | 318/432 |
| 7,566,103 | B2 * | 7/2009 | Wanner | B60W 30/18109 |
| | | | | 477/185 |
| 9,242,565 | B2 * | 1/2016 | Kleickmann | B60L 50/52 |
| 9,561,786 | B2 * | 2/2017 | Shand | B60T 13/12 |
| 9,707,945 | B2 * | 7/2017 | Sakurazawa | B60T 8/4081 |
| 10,661,774 | B2 * | 5/2020 | Hecker | B60T 17/22 |
| 2003/0171865 | A1 * | 9/2003 | Moser | B60T 8/17558 |
| | | | | 701/1 |
| 2003/0227215 | A1 * | 12/2003 | Kinder | B60W 10/18 |
| | | | | 303/3 |
| 2004/0124700 | A1 * | 7/2004 | Luh | B60T 8/17616 |
| | | | | 303/163 |
| 2004/0238244 | A1 * | 12/2004 | Amanuma | B60L 7/26 |
| | | | | 903/917 |
| 2010/0305794 | A1 * | 12/2010 | Foster | B60P 3/20 |
| | | | | 903/930 |
| 2012/0136547 | A1 * | 5/2012 | Miyazaki | B60L 3/108 |
| | | | | 701/70 |
| 2013/0297170 | A1 * | 11/2013 | Kunz | B60T 8/885 |
| | | | | 701/70 |
| 2015/0035352 | A1 * | 2/2015 | Fujiki | B60T 7/042 |
| | | | | 303/15 |
| 2015/0081148 | A1 * | 3/2015 | Heap | B60W 10/08 |
| | | | | 180/65.265 |
| 2015/0224972 | A1 * | 8/2015 | Feigel | B60T 11/26 |
| | | | | 303/15 |
| 2015/0232076 | A1 * | 8/2015 | Oosawa | B60T 13/68 |
| | | | | 303/10 |
| 2015/0239350 | A1 * | 8/2015 | Maucher | B60W 30/18127 |
| | | | | 701/70 |
| 2015/0321649 | A1 * | 11/2015 | Jeon | B60T 8/3275 |
| | | | | 701/70 |
| 2018/0226905 | A1 * | 8/2018 | Botts | B60L 58/12 |
| 2018/0251103 | A1 * | 9/2018 | Satterthwaite | F16D 66/022 |
| 2018/0297475 | A1 * | 10/2018 | Zhao | B60L 7/18 |
| 2019/0039450 | A1 * | 2/2019 | Baba | F16H 63/502 |
| 2019/0275994 | A1 * | 9/2019 | Zhao | B60T 1/10 |
| 2019/0276026 | A1 * | 9/2019 | Shimizu | B60W 30/18072 |
| 2021/0188279 | A1 * | 6/2021 | Glavinic | B60W 10/184 |
| 2021/0213928 | A1 * | 7/2021 | Etzbach | B60T 17/228 |
| 2022/0289037 | A1 * | 9/2022 | Yokoo | B60W 10/08 |
| 2022/0289038 | A1 * | 9/2022 | Yokoo | B60W 50/085 |

FOREIGN PATENT DOCUMENTS

| | | |
|---|---|---|
| EP | 2 463 165 A1 | 6/2012 |
| JP | 11-275708 A | 10/1999 |
| JP | 2002-345105 A | 11/2002 |
| JP | 2004-166363 A | 6/2004 |

OTHER PUBLICATIONS

Written Opinion (PCT/ISA/237) issued in PCT Application No. PCT/EP2022/078637 dated Jan. 16, 2023 (6 pages).

Extended European Search Report issued in European Application No. 21203032.4 dated Mar. 17, 2022 (7 pages).

Japanese-language Office Action issued in Japanese Application No. 2024-522457 dated Mar. 25, 2025 with English translation (15 pages).

* cited by examiner

METHOD FOR CONTROLLING A MULTITUDE OF BRAKING DEVICES AND BRAKING SYSTEM OF A VEHICLE

BACKGROUND AND SUMMARY

The present invention relates to a method for controlling a multitude of braking devices of a vehicle to effect a desired brake function as well as to a braking system of a vehicle.

Electrical vehicles may be equipped with multiple driving motors which can be used as braking devices, in particular as regenerative brakes. Regenerative brakes produce electric current from kinetic energy to recuperate, when braking, a portion of the energy from the motion of the vehicle.

Such vehicles may further be equipped with dissipative non-frictional brakes, for example eddy current brakes or electric retarders. This kind of brake may use resistive losses from eddy currents induced in moving parts to remove kinetic energy from the vehicle and dissipate it as heat.

Furthermore, such vehicles may additionally be equipped with frictional brakes as well.

Each of these brakes has a different operating capability in terms of achievable torque, force and/or acceleration. Furthermore, regenerative brakes may have varying operating capabilities in that they each may have a specific regeneration efficiency.

When a desired brake function is to be achieved with such diverse braking devices, various goals, some of which are contradictory, need to be accounted for. For example, a steer-by-brake situation is to be avoided or one of the braking devices on its own may not be able to provide a sufficient brake function.

Utilization of the brakes may have stability implications for the whole vehicle. For example, if brakes on left and right sides of a vehicle effect diverging braking torque, they may drag the vehicle in one direction. This effect is called steer-by-brake and is one of the steering modes of tracked vehicles, but disadvantageous in wheeled vehicles as their regular steering mechanism is rendered ineffective by the effect.

Given the above, the invention aims to improve utilization of said brakes to effect not only a desired brake parameter, e.g. braking torque, but to do so taking into account specific needs of electric vehicles.

This is achieved by a method and a braking system according to the independent claims.

The problem is solved by a method for controlling a multitude of braking devices of a vehicle to effect a desired brake function quantified as a desired brake parameter, wherein each of the braking devices is controllable by an actuation parameter to effect at least a portion of said desired brake function. The method comprises the steps of: determining, for each braking device, a brake capability representing a maximum brake function achievable with the braking device; determining, for each braking device, an actuation priority, wherein the actuation priority is determined from at least one predetermined operating parameter of the braking device and/or the vehicle; in order from highest priority to lowest priority of the braking devices; allocating, to each braking device, the actuation parameter, wherein the actuation parameter is chosen between the brake capability and the quantity of the desired brake parameter not yet allocated to other braking devices, whichever is lower.

In this way, brakes that are more desirable to use in a particular braking situation are preferentially utilized as they have a higher priority. In this way, preferred braking devices can be used before other, less preferred, braking devices.

In further embodiments, the desired brake parameter, the maximum actuation parameter and/or the actuation parameter each are expressed as one of the following: a torque, a force, a retardation.

These kinds of parameters are easily measurable and available as inputs and/or outputs of braking devices, brakes and/or sensors.

In further embodiments, when determining the actuation priority, braking devices comprising a non-frictional brake are determined to have a higher priority than braking devices comprising frictional brakes.

Preferring non-frictional brakes allows for better longevity of frictional brake devices as this kind of brake device deteriorates through use.

In further embodiments, when determining the actuation priority, braking devices comprising regenerational brakes are determined to have a higher priority than braking devices comprising dissipational brakes.

In particular for electric vehicles, regenerating some electric energy from a braking action allows the electric vehicles to cover larger distances before requiring a recharge.

In further embodiments, when determining the actuation priority, the higher the regeneration efficiency is of regenerational brake devices, the higher its priority will be relative to other braking devices comprising regenerational brakes.

In this way, higher regeneration efficiency of a braking device will lead to that braking device being used preferentially.

In further embodiments, when determining the actuation priority, one or more of the following parameters is taken into account: type or types of braking comprised in the braking devices, efficiency of regenerational braking comprised in the braking devices, recuperation ratio of regenerational braking comprised in the braking devices, current vehicle speed, current dynamic vehicle state, state of charge of a traction battery, axle load of the vehicle, individual loads on each axle of the vehicle, brake device response time, brake device response brake force, configurable priority value.

With these parameters, the distribution of the braking function to the appropriate and/or preferred braking devices can be carried out with specific, in particular with closed-loop control goals in mind.

In further embodiments, where a braking device comprises multiple brake devices, the actuation parameter is distributed among the brake devices according to predefined and/or calculated distribution ratios.

Such ratios may, for example, take into account constructional differences between the brake devices or may just result in an equal distribution.

In further embodiments, when multiple braking devices are determined to have the same actuation priority, in the allocate step, the brake capabilities of the multiple braking devices determined to have the same actuation priority are conflated and the actuation parameter allocated to the multiple braking devices distributed to the braking devices according to predefined and/or calculated allocation ratios.

Such ratios may, for example take into account constructional differences between the braking devices or the positioning of the braking devices, for example on different sides of the vehicle.

The problem is also solved by a braking system of a vehicle, comprising a first braking device comprising at least one frictional brake, a second braking device comprising at least one regenerative brake and a control device, wherein the control device is configured to implement the method according to any of the previous embodiments.

Such a braking system improves maintenance intervals and the range, in particular of electric vehicles.

Embodiments of the disclosure are now described in detail. Referring to the drawing, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

DETAILED DESCRIPTION OF THE DRAWING

Figure 1:
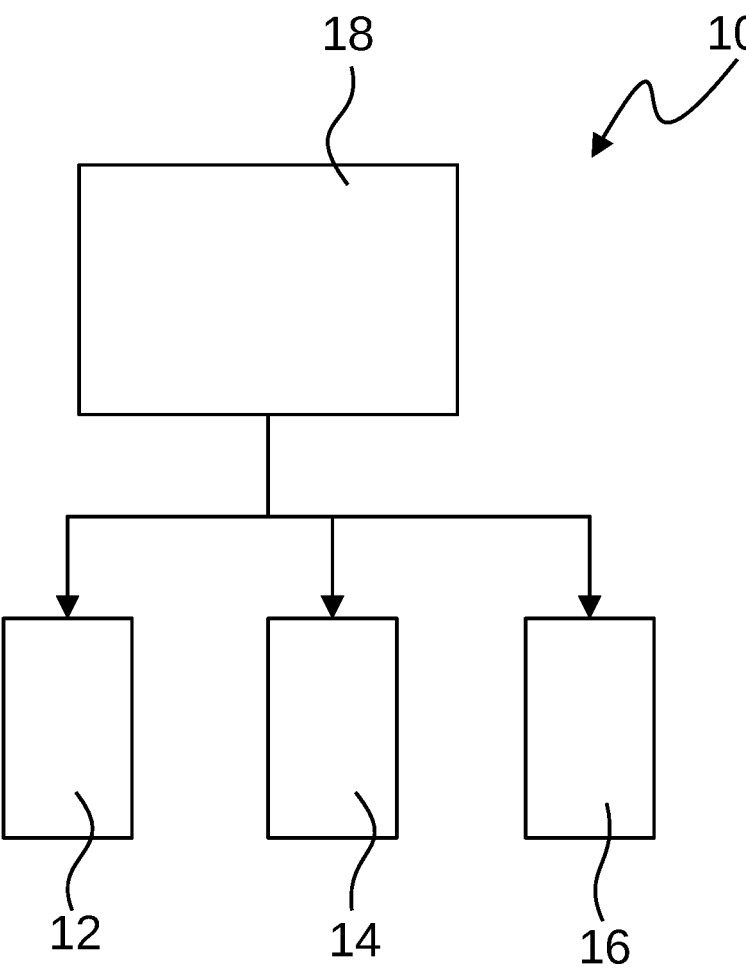
FIG. 1 is a schematic block diagram of a braking system of a vehicle according to an embodiment of the present invention.

The braking system 10 of an electric vehicle comprises a first braking device 12, a second braking device 14 and a third braking device 16. The braking system 10 further comprises a control device 18 configured to control the braking devices 12, 14, 16.

The first braking device 12 comprises a frictional brake. The second braking devices 14 comprises a non-frictional dissipational brake. The third braking device 16 comprises a non-frictional regenerational brake.

In further embodiments, each of the braking devices 12, 14, 16 may comprise one or more brake devices.

Each of the braking devices 12, 14, 16 is controllable by means of an actuation parameter which may, for example, be transmitted mechanically (e.g. displacement, brake pedal), electrically (e.g. as a voltage) or electronically (e.g. digitally via a communication bus or by direct connection). The control device 18 is configured to provide the actuation parameter to the braking devices 12, 14, 16 such that the braking devices 12, 14, 16 together effect the desired brake function.

When the vehicle needs to brake, the control device 18 carries out a method for controlling the multitude of braking devices 12, 14, 16 to effect the desired brake function. The desired brake function is usually communicated to the control device 18 as a representation of a desired braking parameter to be controlled. Examples for such desired braking parameters may be e.g. a desired braking force, a desired braking torque or a desired braking retardation/acceleration.

Each of the braking devices 12, 14, 16 has a brake capability. Such a brake capability represents a maximum brake function achievable with a braking device. This maximum brake function may, for example, be represented as a maximum brake torque. The maximum brake torque of each braking device may be dependent on a dynamic state of the vehicle, in particular on its speed. The control device 18 determines, in a first step, for each braking device 12, 14, 16 the brake capability representing a maximum brake function achievable with said braking device 12, 14, 16.

In further embodiments, the brake capability may, for example, be also determined by a measured dynamic state of the vehicle, for example a wheel slip, an allowed slip or slip stiffness and/or a state of charge of a traction battery of the vehicle. This may help to avoid ABS activity and/or overcharging the traction battery.

In a second step, the control device 18 determines, for each braking device 12, 14, 16, an actuation priority, wherein the actuation priority is determined from at least one predetermined operating parameter of the braking devices 12, 14, 16 and/or the vehicle.

In further embodiments, the predetermined operating parameter may, for example, be the kind of brake comprised in the braking devices. For example, for an electric vehicle, it may be expedient to achieve as much of the desired brake parameter as possible using regenerational brakes as comprised in the braking devices 16. Furthermore, it may be expedient to achieve as much of the desired brake parameter as possible using non-frictional brakes as comprised in the braking devices 14, 16.

These considerations would, in that particular case, lead to the braking device 16 having the highest priority, the braking device 14 having the second highest priority and the braking device 12 having the third highest priority.

The control device 18 will then, in a third step, go through the braking devices 12, 14, 16 in order from highest priority to lowest priority and allocate an actuation parameter to each of the braking devices 12, 14, 16. Each of the actuation parameters represents a portion of the desired brake function to be effected by each of the braking devices 12, 14, 16. The actuation parameter for each braking device 12, 14, 16 is chosen between the brake capability, as this represents the maximum brake function that can be affected by each of the braking devices 12, 14, 16 and the quantity of the desired brake parameter not allocated to other braking devices, whichever is lower.

To further illustrate this method, the following example calculations resulting from the method will be shown. Each of these examples is not based on actual measurements but constructed only to better show how to carry out the method. The values given herein are also not measured but given for illustration purposes only.

The first braking device 12, which comprises a frictional brake, may, for example, have a maximum brake torque between 15000 Nm and 17000 Nm depending on the speed that the vehicle is moving at.

The second braking device 14 may, for example, have a maximum brake torque of 4000 Nm. The third braking device 16 may, for example, have a maximum brake torque of 2500 Nm.

In a first example, the driver of the vehicle may press the brake pedal such that the desired brake torque is 3000 Nm.

The control device 18 has determined the highest priority braking device to be the regenerational third brake 16, the second highest priority braking devices to be the dissipational second brake 14 and the third highest priority braking devices to be the frictional third brake 12. The control device 18 may, for example, keep information about the priorities of the braking devices 12, 14, 16 in a memory as an ordered list.

The control device 18 starts by allocating an actuation parameter to the (regenerational) third brake 16 because the third brake 16 has the highest priority. The maximum brake torque of the third brake 16 is 2500 Nm, which is smaller than the desired brake torque of 3000 Nm. The control device 18 allocates the maximum value of 2500 Nm to the third brake 16.

The control device 18 then allocates the remaining desired brake torque of 500 Nm as the actuation parameter to the second brake 14, which is the brake 12, 14, 16 having the next lower priority, wherein the allocated desired brake torque of 500 Nm is lower than the maximum brake torque of the second brake.

The braking device 12, 14, 16 having the next lower priority is the frictional first brake 12 which, in this example, is allocated an actuation parameter representing 0 as all of the desired brake torque has already been allocated to higher priority braking devices 14, 16. Thus, in this case, no further brake function beyond that which has already been allocated is necessary to achieve the desired brake function.

The braking devices 12, 14, 16 will then, according to the actuation parameters transmitted to them, effect a braking torque.

In another example, when the desired braking torque is 2500 Nm or less, only the regenerational third brake 16 will be allocated and receive an actuation parameter representing more braking torque than 0.

In yet another example, when the desired braking torque exceeds the combined maximum braking torque of the second and third brake 14, 16, the remaining braking torque will be allocated to the first frictional brake 12.

In further embodiments, multiple regenerational first braking devices 16 may be present. These first braking devices 16 may have different efficiencies. When determining the actuation priority of the braking devices 12, 14, 16, the control device 18 will determine first braking devices 16 having a higher efficiency to have a higher priority relative to other first braking devices 16 having a lower efficiency.

In further embodiments, when multiple braking devices 12, 14, 16 are present, they may be located on different axles of the vehicle. If, in this situation, any of the braking devices 12, 14, 16 have the same priority, the control device 18 will, for example, allocate the actuation parameter according to the load present on each of the axles. In particular, the control device 18 will, for example, allocate more of the actuation parameter to braking devices 12, 14, 16 located on the axle having a higher load.

In further embodiments, when, more generally, multiple braking devices 12, 14, 16 are arranged on different sides of the vehicle, for example some braking devices 12, 14, 16 are arranged on the left side of the vehicle while other braking devices 12, 14, 16 are arranged on the right side of the vehicle, the control device 18 will, for example, allocate the actuation parameter such that the braking parameter on each side of the vehicle is balanced. In this way, a situation wherein the vehicle is steered into a particular direction by unbalanced braking is avoided. In these embodiments, the actuation parameter may, for example, be distributed among the brake devices and/or the braking devices 12, 14, 16 according to predefined or calculated distribution ratios and/or allocation ratios. For example, when a vehicle is currently driving in a curve, a distribution or allocation ratio may be calculated to distribute or allocate 60% of the braking torque (braking parameter) on one side and 40% of the braking torque (braking parameter) on the other side of the vehicle.

In further embodiments, for example, braking devices 12, 14, 16 of the same kind located on the same axle but on different sides of the vehicle are determined to have the same priority. In this case, the actuation parameters, and thus the brake parameter to be effected may, for example, be distributed equally between braking devices 12, 14, 16 situated on the same axle.

Due to this described prioritization of brake the braking devices 12, 14, 16, for example, for small desired brake parameters, only one of the braking devices 12, 14, 16 will be utilized. When, for example, the desired brake parameters exceeds the capabilities of said one braking devices 12, 14, 16, another of the braking devices 12, 14, 16 will also become utilized. When, for example, the desired brake parameter rises further, further braking devices 12, 14, 16 will be utilized as necessary.

Embodiments may for example prefer non-frictional, regenerational brakes determining a higher priority for them, to extend the range of the vehicle and extend any maintenance intervals. Frictional first brakes 12 may, for example, only be utilized when the brake capability of all the other braking devices 14, 16 is not sufficient to effect the desired brake parameter.

The term "highest priority" may have different representations according to how priority is represented. Where priority is represented for example as a number, the highest priority may, for example, be represented by the highest number or may, for example, be represented by the lowest number.

The term "operating capability" may, for example, refer to a maximum of a braking parameter attainable by the brake device, for example a maximum torque and/or a maximum force and/or a maximum acceleration.

The actuation parameter, the desired brake parameter and/or the maximum brake function may be represented in any suitable manner. In different embodiments, they may be represented, for example, as a torque value, a percentage of a reference value, an integer or floating point number.

The methods described above may be performed by a properly programmed general purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, solid state drives, and so on. For purposes of the disclosure herein, a computer-readable media may comprise any form of data storage mechanism, including such existing memory technologies as well as hardware or circuit representations of such structures and of such data.

Any above reference to data structures, e.g. "integer number", "floating-point number", "list", "dictionary", "array" etc. refers to the concept of said data structure and shall be understood to not be limited to any particular implementation or physical representation of said structure within a computing and/or storage device.

LIST OF REFERENCES 10 braking system
12 (frictional/first) braking device (brake)
14 (dissipational/second) braking device (brake)
16 (regenerational/third) braking device (brake)
18 control device

The invention claimed is:

1. A method for controlling a multitude of braking devices of a vehicle to effect a desired brake function quantified as a desired brake parameter, wherein each of the braking devices is controllable by an actuation parameter to effect at least a portion of said desired brake function, the method comprising the steps of:

determining, for each braking device, a brake capability representing a maximum brake function achievable by the braking device, determining, for each braking device, an actuation priority, wherein the actuation priority is determined from at least one predetermined operating parameter of the braking device and/or the vehicle; and in order from highest priority to lowest priority of the braking devices, allocating, to each braking device, the actuation parameter, wherein the actuation parameter is chosen between the brake capability and the quantity of the desired brake parameter not yet allocated to other braking devices, whichever is lower.

2. The method according to claim 1, wherein the desired brake parameter, the maximum actuation parameter and/or the actuation parameter each are expressed as one of the following: a torque, a force, a retardation.

3. The method according to claim 1, wherein when determining the actuation priority, braking devices comprising non-frictional brakes are determined to have a higher priority than braking devices comprising frictional brakes.

4. The method according to claim 1, wherein when determining the actuation priority, braking devices comprising regenerational brakes are determined to have a higher priority than braking devices comprising dissipational brakes.

5. The method according to claim 4, wherein when determining the actuation priority, the higher a regeneration efficiency of a regenerational brake, the higher its priority relative to other brakes comprising regenerational brakes.

6. The method according to claim 1, wherein when determining the actuation priority, one or more of the following parameters is taken into account:

type or types of brake(s) comprised in the braking devices, efficiency of regenerational brakes comprised in the braking devices, recuperation ratio of regenerational brake devices comprised in the braking devices, current vehicle speed, current dynamic vehicle state, state of charge of a traction battery, axle load of the vehicle, individual loads on each axle of the vehicle, brake device response time, brake device response brake force, configurable priority value.

7. The method according to claim 1, wherein where a braking device comprises multiple brake devices, the actuation parameter is distributed among the multiple brake devices according to predefined and/or calculated distribution ratios.

8. The method according to claim 1, wherein when multiple braking devices are determined to have the same actuation priority, in the allocating step, the brake capabilities of the multiple braking devices determined to have the same actuation priority are conflated and the actuation parameter allocated to the multiple braking devices is distributed among the brake devices according to predefined and/or calculated allocation ratios.

9. The method according to claim 1, wherein, when determining the actuation priority, axle load of the vehicle and individual loads on each axle of the vehicle are taken into account.

10. The method according to claim 1, wherein, when determining the actuation priority, a current dynamic vehicle state is taken into account.

11. A braking system of a vehicle, comprising:

a first braking device comprising at least one frictional brake, a second braking device comprising at least one regenerative brake, and a control device, wherein the control device is configured to:

determine, for each braking device, a brake capability representing a maximum brake function achievable by the braking device, determine, for each braking device, an actuation priority, wherein the actuation priority is determined from at least one predetermined operating parameter of the braking device and/or the vehicle;

in order from highest priority to lowest priority of the braking devices, allocate, to each braking device, the actuation parameter, wherein the actuation parameter is chosen between the brake capability and the quantity of the desired brake parameter not yet allocated to other braking devices, whichever is lower.

12. The braking system according to claim 11, wherein, when determining the actuation priority, axle load of the vehicle and individual loads on each axle of the vehicle are taken into account.

13. The braking system according to claim 11, wherein, when determining the actuation priority, a current dynamic vehicle state is taken into account.

* * * * *